United States Patent [19]

Ettinger et al.

[11] Patent Number: 5,280,433
[45] Date of Patent: Jan. 18, 1994

[54] SHAPE ADAPTIVE PROCESS APPARATUS

[75] Inventors: Gary C. Ettinger, Campbell; Donald J. Christian, Fremont, both of Calif.

[73] Assignee: FMC Corporation, Chicago, Ill.

[21] Appl. No.: 692,761

[22] Filed: Apr. 29, 1991

[51] Int. Cl.$^5$ .............................. G06F 15/46
[52] U.S. Cl. ........................ 364/468; 382/1; 382/8; 382/54; 118/669
[58] Field of Search .......... 118/314, 669, 621, 322, 118/686, 687, 679; 901/43; 364/468; 239/694; 382/11, 8, 1, 54

[56] References Cited

U.S. PATENT DOCUMENTS

| | | | |
|---|---|---|---|
| 2,858,798 | 11/1958 | Sedlacsik | 118/621 |
| 4,278,046 | 6/1981 | Clarke et al. | 901/43 X |
| 4,360,274 | 11/1982 | Norton-Wayne | 364/556 X |
| 4,421,800 | 12/1983 | Schoenberg et al. | 118/314 X |
| 4,597,533 | 7/1986 | Shirai et al. | 118/627 |
| 4,862,377 | 8/1989 | Reedman et al. | 364/468 |
| 4,941,182 | 7/1990 | Patel | 901/43 X |
| 4,985,846 | 1/1991 | Fallon | 364/468 |

Primary Examiner—Jerry Smith
Assistant Examiner—Brian C. Oakes
Attorney, Agent, or Firm—L. B. Guernsey; M. B. Lee; R. C. Kamp

[57] ABSTRACT

Apparatus for applying a product to a plurality of workpieces having a variety of sizes and shapes. An imager captures an image of each workpiece and develops image signals which a systems controller and a processor use to regulate delivery of a product to each workpiece. The apparatus reduces overspray and waste while providing coverage of each workpiece by the product.

4 Claims, 5 Drawing Sheets

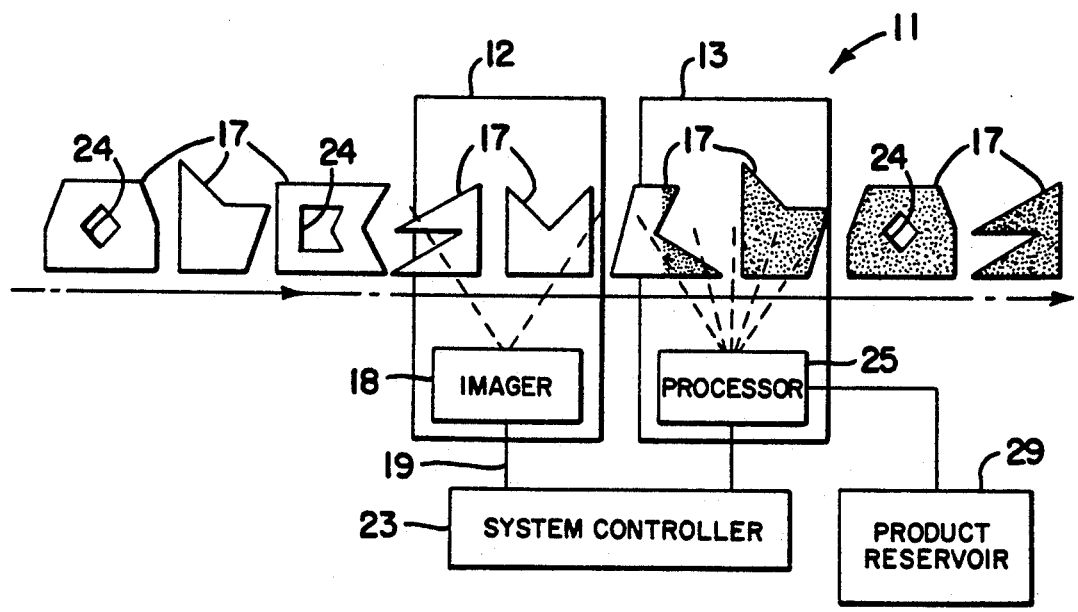
FIG_1
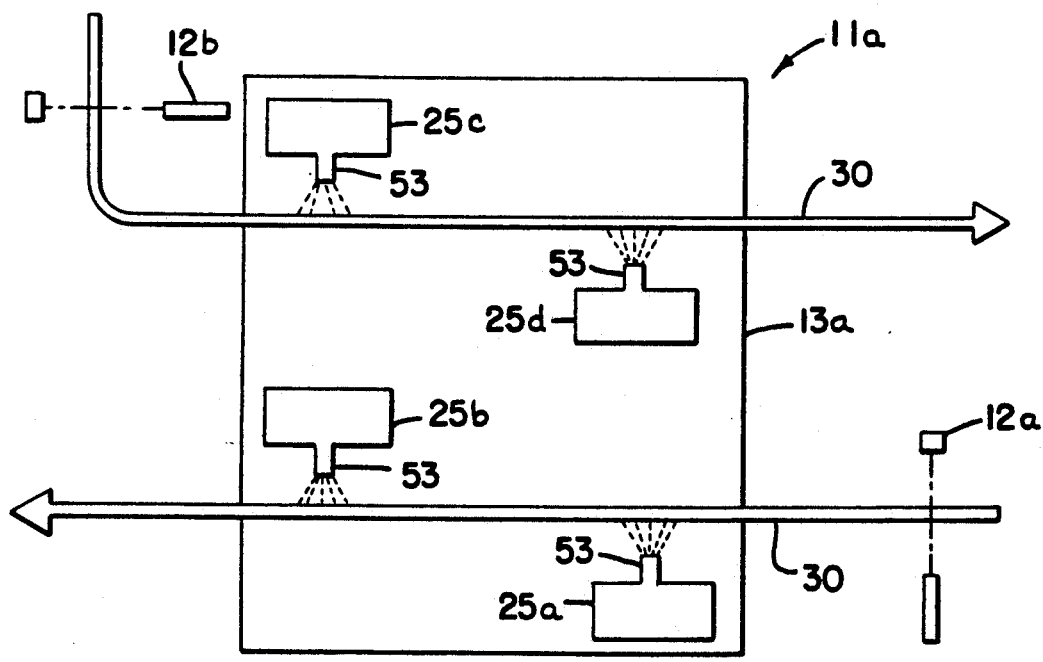
FIG_2

FIG_3
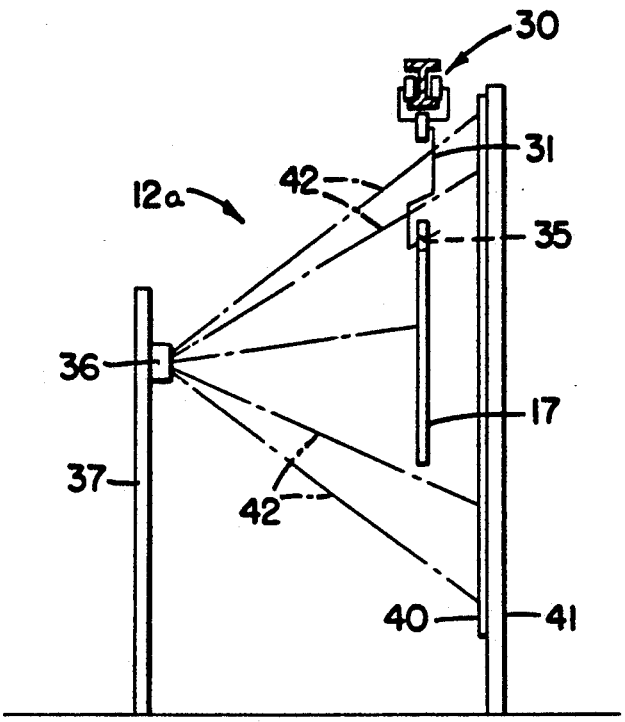
FIG_4
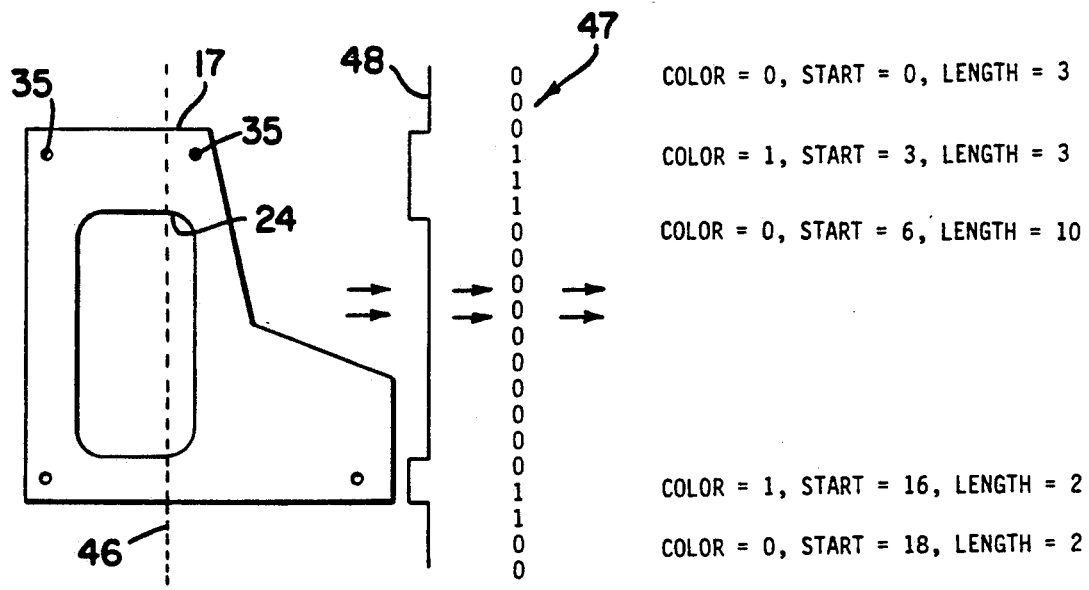

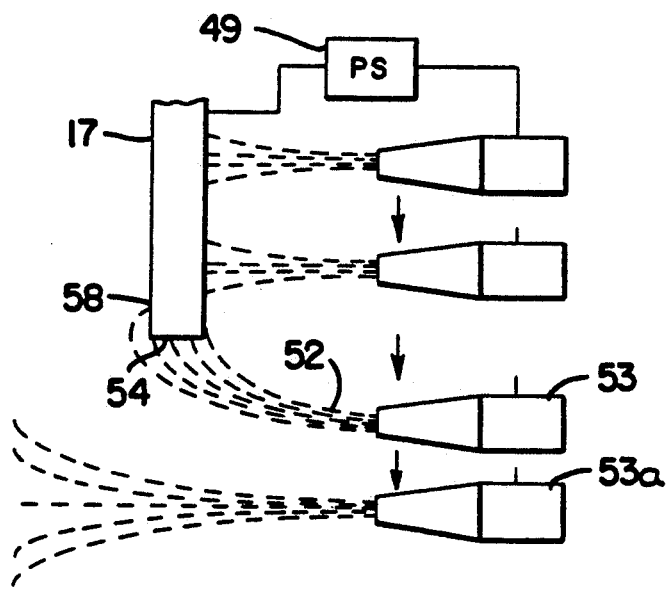
FIG_5
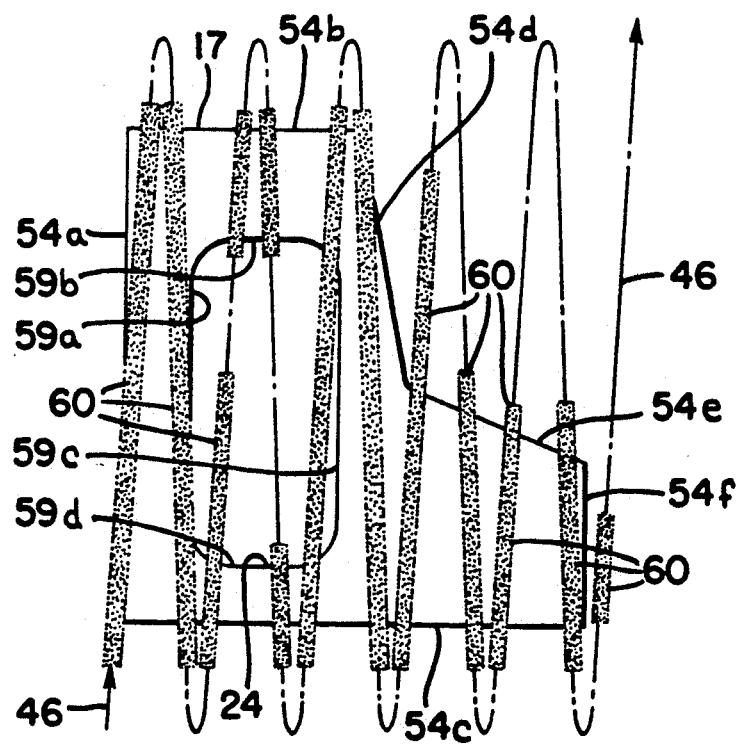
FIG_6

FIG_8

```
000000000000000000000000000000000000000000
000000000000000000000000000000000000000000
000000000000000000000000000000000000000000
0001111111111111110000000000000000000000
0001111111111111110000000000000000000000
0001111111111111110000000000000000000000
000111100000001110000000000000000000000
000111100000000111000000000000000000000
000111100000000111000000000000000000000
000111100000000111100000000000000000000
000111100000000111110000000000000000000
000111100000000111111111100000000000000
000111100000001111111111111110000000000
000111100000001111111111111110000000
000111111111111111111111111110000
000111111111111111111111111110000
000111111111111111111111111110000
000000000000000000000000000000000000000000
000000000000000000000000000000000000000000
000000000000000000000000000000000000000000
```

61, 17a, 59, 24, 54

FIG_9

```
0000000000000000000000000000000000000000000
0000000000000000000000000000000000000000000
000011111111111111100000000000000000000
000011111111111111110000000000000000000
000011111111111111110000000000000000000
000011111111111111111000000000000000000
000011111111111111110000000000000000000
00001111110001111100000000000000000
0000111111100000111111000000000000000
0000111111100000111111000000000000000
000011111110000011111110000000000000
000011111110000011111111110000000
00001111111000001111111111111110000
000011111110000011111111111111110000
000011111110000011111111111111111000
000011111111000111111111111111110000
000011111111111111111111111111110000
0000111111111111111111111111111110000
000000000000000000000000000000000000000000
000000000000000000000000000000000000000000
```

61a, 17a, 65, 66, 24

SHAPE ADAPTIVE PROCESS APPARATUS

BACKGROUND OF THE INVENTION

The present invention pertains to an apparatus which optimizes process performance, and more particularly, to a process apparatus which compensates for variations in size, shape and position of a material being processed while optimizing performance.

Treatments of various types are commonly applied to workpieces or solid objects for the purpose of removal or application of paint and other coatings, washing, cleaning, and surface texturing. Many of these processes use chemicals, paints, energy and other valuable resources whose consumption it is desirable to minimize. It is often desirable to minimize resource consumption to reduce ecological effects on wildlife, animals, plants and humans. In the application of paints to workpieces it is important to minimize waste caused by overspraying and yet to insure a minimum level of treatment while treating a large number of workpieces rapidly and efficiently.

SUMMARY OF THE INVENTION

The present invention discloses apparatus for optimizing the application of a product to a workpiece by compensating for variations in size, shape and position of the workpiece. The apparatus uses an imager for capturing an image of a workpiece to be processed and developing image signals which correspond to the parameters of the workpiece. A systems controller uses the image signals to develop a plurality of control signals which cause a processor to regulate the delivery of a product to the workpiece. The apparatus automatically adjusts to a large number of workpieces which may vary in size, shape and placement of holes encircled by the workpiece. The various workpieces can be presented in any order with each workpiece receiving an optimized application of a product. The apparatus can automatically provide an overspray pattern to cover each of the edges or side surfaces of a workpiece. The apparatus automatically adjusts the treatment process to fit a new, unknown size and shape of a workpiece without any human assistance. The apparatus interfaces with existing conventional treatment equipment and operates at a reduced cost.

BRIEF DESCRIPTION OF THE DRAWINGS

FIG. 1 is a schematic of the process apparatus of the present invention and illustrating the various sensors and controls.

FIG. 2 is a schematic top view of a spray booth used with the present invention.

FIG. 3 is a side view of a laser imaging station for detecting the size, shape and position of a workpiece.

FIG. 4 illustrates a digitized signal developed by a single vertical laser scan of a workpiece at the laser imaging station of FIG. 3.

FIG. 5 illustrates an electrostatic "wrap-around" of a product for processing edges of a workpiece.

FIG. 6 illustrates an optimum overspray pattern for processing edges of a workpiece.

FIG. 8 is similar to FIG. 7 with the digital signals superimposed on the figure of the workpiece.

FIG. 9 illustrates a set of digital signals similar to those in FIG. 8 but includes signals which provide overspray for the edges around the outer portions of the workpiece and for the edges of a hole near the center of the workpiece.

DESCRIPTION OF THE PREFERRED EMBODIMENT

Figure 7:
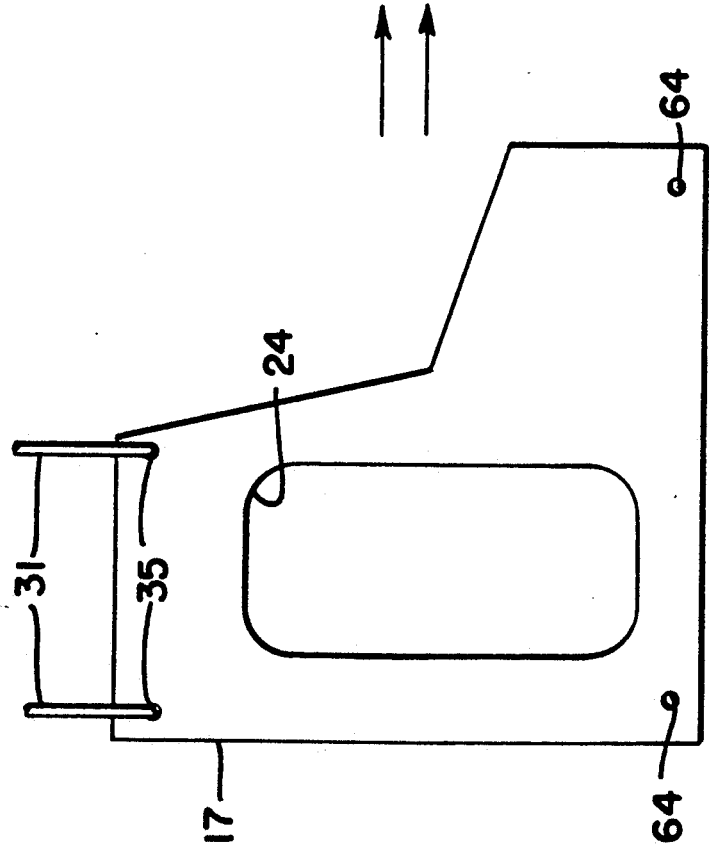
FIG. 7 illustrates a digitized set of signals generated by a laser scan of a workpiece.

A shape-adaptive process apparatus 11 of the present invention includes an imaging station 12 and a processing station 13 as shown in FIG. 1. A plurality of irregularly shaped workpieces 17 are transported through imaging station 12 where the size, shape and position of each workpiece 17 is sensed by an imager 18. Imager 18 provides image signals over an output lead 19 to a system controller 23. The image signals provide information corresponding to the size, shape and location of the nearest workpiece inside station 12 and includes the location of any holes or voids 24 in the workpiece. The image signals cause systems controller 23 to provide control signals to a processor 25 which controls delivery of a product from a product reservoir 29 and applies the product to a workpiece 17 in processing station 13. Systems controller 23 uses the speed of movement of workpiece 17 and the image signals to regulate the application of the product to workpiece 17. Systems controller 23 stores the image signals from each of the workpieces and delivers the image signals to processor 25 as the corresponding workpiece moves into processing station 13. One imager 18 which can be used in the present invention is the Model 2802CAM1 line scan camera made by Allen-Bradley/Rockwell of Milwaukee, Wisc. A systems controller which can be used is a Model PS2 computer made by IBM using the "Turbo C" programming language by Borland Company of Scotts Valley, Calif.

A top view of an apparatus 11a for applying a primer spray coating and a finishing spray coating to a plurality of workpieces is shown in FIG. 2. A conveyor 30 transports the workpieces (not shown) past a first imager 12a into processing station 13a where a primer coating is applied to both sides of the workpiece by a pair of processors 25a, 25b. The coated workpiece is then passed through an oven (not shown) where the primer coating is dried. Conveyor 30 returns the dried workpiece past a second imager 12b into processing station 13a where a finishing coating is applied to both sides of the workpiece by another pair of processors 25c, 25d. The finished workpiece is then passed through another oven (not shown) where the finishing coating is dried.

A side view of imaging station 12a (FIG. 3) illustrates a workpiece 17 suspended from conveyor 30 by a pair of hooks 31 in a pair of mounting holes 35. Station 12a includes a laser generator/detector 36 mounted on a support 37 and a retroreflector 40 mounted on a support 41. Generator/detector 36 is similar to stationary bar code readers. A laser beam is aimed into a spinning mirror (not shown) which transmits a moving beam 42 toward retroreflector 40. Any portion of the sweeping laser beam 40 which is not intercepted by workpiece 17 is reflected by retroreflector 40 to a detector portion of generator/detector 36. A microprocessor in imager 18 (FIG. 1) digitizes the reflected beam into linear pixels to form a plurality of scan lines. The scan lines are transmitted to the system controller 23 where they are assembled to form a continuous image of the workpiece. Signals caused by hooks 31 (FIG. 3) are filtered from the workpiece image to prevent paint from being applied to the hooks. To prevent sunlight from interfering with the reflected laser beam (FIG. 3) a helium-neon laser is used as a source and the received light is dichroically filtered before it enters the detector. The detected signal is amplified and clipped to produce a binary 0 for no object present and a binary 1 when an opaque object is present.

Laser beam 42 scans a plurality of vertical lines (FIGS. 4, 6) to develop a raster which illustrates the shape of a workpiece 17. A single scan line 46 is shown in FIG. 4 with a series of binary signals 47 and a corresponding analog signal 48 which are developed as line 46 is scanned by the laser beam 42 (FIG. 3). Each line provides 15360 picture elements or pixels which are scanned and stored in a processor memory. Twenty scans are made each second with more than 300,000 pixels imaged per second. The lines of pixels are loaded serially into memory as the workpiece passes the sensor and are shifted along to match the moving conveyor 30. The pixels are removed from memory after the workpiece passes the last sprayer. To reduce the large bulk of data, a compression scheme called "run length encoding" is used. Since a typical line of code may include 2947 zeros, then 2492 ones, 1894 zeros, 4465 ones and 3562 zeros, each run of identically colored pixels (ones or zeros) is called a linear blob. After the raster lines are assembled, a two-dimensional blob pattern is used which corresponds to the geometry of the workpiece.

The scanner forms its image in a polar coordinate space which is established by an encoder keyed to the rotating mirror which provides the scan of the laser beam. Because the laser generator/receiver or scanner 36 (FIG. 3) is closer to the center of workpiece 17 than to the edges, the effective resolution of the images is not constant. Resolution is greatest when the beam is horizontal and decreases toward the edges of the workpiece. To provide better control of the paint sprayers, the image is converted into linear cartesian coordinates by the processor and the conversion is completed by using a Taylor series expansion in software.

In order to minimize waste the paint spray (FIG. 5) is electrostatically charged by a power source 49 so a spray stream 52 from a nozzle 53 is applied to an edge 54 of workpiece 17. Some of the spray actually passes workpiece 17, reverses direction and lands on a portion of the far side 58. Some of the overshoot spray is required to reach the edges, inside holes and cutouts in workpiece 17. When the nozzle reaches the position shown as 53a the paint stream resumes a straight line and the stream is shut off.

When a complete raster of scan lines 46 moves over workpiece 17 (FIG. 6) an overspray needs to be provided to reach each of the outside edges 54a–54f of the workpiece and for inside edges 59a–59d of hole 24. Thus, the spray is provided for each of the sections 60 of the reciprocator mounted spray gun path 46.

As each raster line of a workpiece 17 is scanned, the laser scanner transmits the coded pixel stream to the controller 23 (FIG. 1). The controller assembles the rasters into a two-dimensional image 61 as shown in FIG. 7. Each of the "ones" in the image represents a section of the workpiece and each of the "zeros" represents an empty space. It can be seen that the pair of suspension hooks 31 (FIG. 7) are shown as "ones" in the upper three rows of the digital image at the right of workpiece 17. A pair of holes 64 are shown as "zeros" in the fifth row from the bottom in the digital image. Processor 25 (FIG. 1) is programmed to ignore any holes less than one inch in diameter so the inside edges of holes 64 (FIG. 7) will be painted. Processor 25 is also programmed to ignore the hooks 31 so they will not be painted.

The digital image of workpiece 17a is superimposed upon the workpiece in FIG. 8. The digital image of workpiece 17a is a "raw plate" map which corresponds to the actual shape of the workpiece with no allowance for overspray. As a result the outside edges 54 of the workpiece and the inside edges 59 of hole 24 would not be sprayed.

The controller assembles the rasters into a two-dimensional image 61a (FIG. 9) which illustrates the map of workpiece 17a modified slightly to include an overspray zone 65 (FIG. 9) around the edges of workpiece 17a, and to include another overspray zone 66 around the edges of hole 24. This is accomplished by using a pair of dilating morphological operators in the software. One dilation operator operates in the X direction and another dilation operates in the Y direction to transform the "zeros" which border the workpiece into "ones" but these dilations do not affect the other pixels in the map.

Thus, the apparatus of the present invention optimizes the application of a product to a plurality of workpieces without the need for human assistance. The workpieces can be different sizes, shapes and have a variety of holes in the workpieces. The apparatus is able to sense the differences in the workpieces and apply the product to all needed portions with a minimum of waste of the product. In addition, the edges of holes and sides of the workpieces can be automaticaly coated with the product. Some examples of product application include: spraying primer and paint on metal plates; applying soap, water and wax on automobiles; applying de-icing chemicals on airplanes before takeoff; sand blasting metal parts to surface finish; and laser induced curing of epoxy surface coatings.

Although the best mode contemplated for carrying out the present invention has been herein shown and described, it will be apparent that modification and variation may be made without departing from what is regarded to be the subject matter of the invention.

What is claimed is:

1. Apparatus for optimizing application of a product to a workpiece by compensating for variations in size, shape and position of the workpiece being processed, said apparatus comprising;

an integer for capturing an image of a workpiece to be processed and for developing a plurality of image signals which correspond to a size, shape and position of said workpiece;

a system controller connected to said integer for receiving said image signals, and said image signals causing said controller to develop a plurality of corresponding control signals;

a processor connected to said controller for using said control signals to regulate delivery of a product to said workpiece; and means for extending said image of said workpiece beyond each of a plurality of boundaries of said workpiece; and means for electrostatically charging a stream of a product being delivered to said workpiece to facilitate the application of a portion of said product to a plurality of edges of said workpiece, wherein the workpiece is held by at least one hook and wherein the system controller is capable of processing the image signals so that the plurality of corresponding control signals prevents the delivery of the product to part of the hook.

2. An apparatus for optimizing application of a product to a workpiece by compensating for variations in size, shape and position of the workpiece hung on a hook and being processed, said apparatus comprising:
an imager for capturing an image of a workpiece and hook to be processed and for developing a plurality of image signals which correspond to a size, shape and position of said workpiece;
a system controller connected to said imager for receiving said image signals and filtering out hook image signals, and said image signals causing said controller to develop a plurality of corresponding control signals; and
a processor connected to said controller for using said control signals to regulate delivery of a product to said workpiece, while preventing delivery of the product to part of the hook.

3. An apparatus for optimizing, as claimed in claim 2, wherein the imager comprises a single laser and a single laser detector.

4. An apparatus for optimizing, as defined in claim 2, wherein the imager comprises a laser generator/detector.

* * * * *